Dec. 19, 1950　　　M. C. OTTENBACHER　　　2,534,558
SELF-UNLOADING VEHICLE
Filed Dec. 27, 1948　　　　　　　　　　　　　3 Sheets-Sheet 1

Inventor
MARTIN C. OTTENBACHER
By
Wheeler, Wheeler & Wheeler
Attorneys

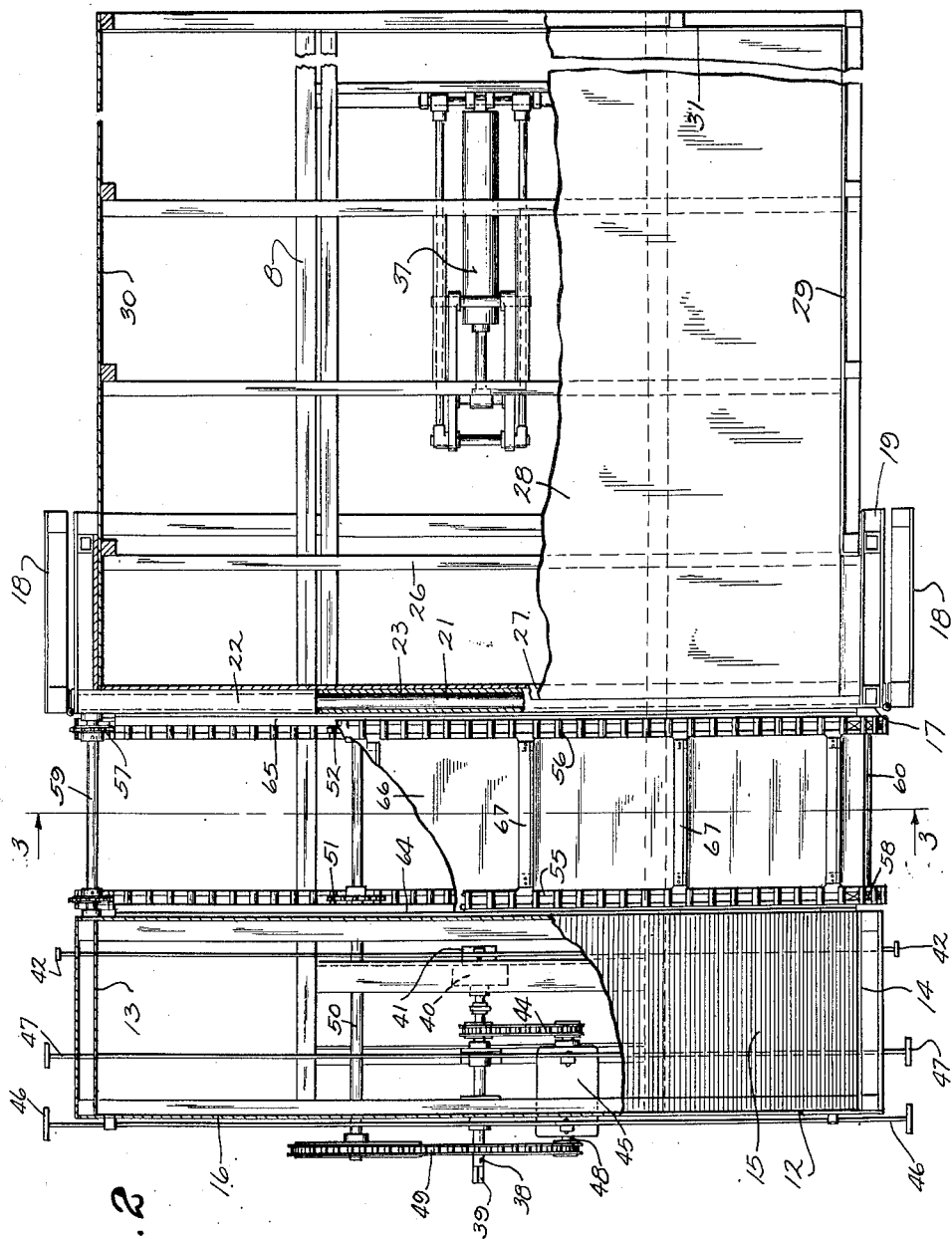

Dec. 19, 1950 M. C. OTTENBACHER 2,534,558
SELF-UNLOADING VEHICLE
Filed Dec. 27, 1948 3 Sheets-Sheet 3
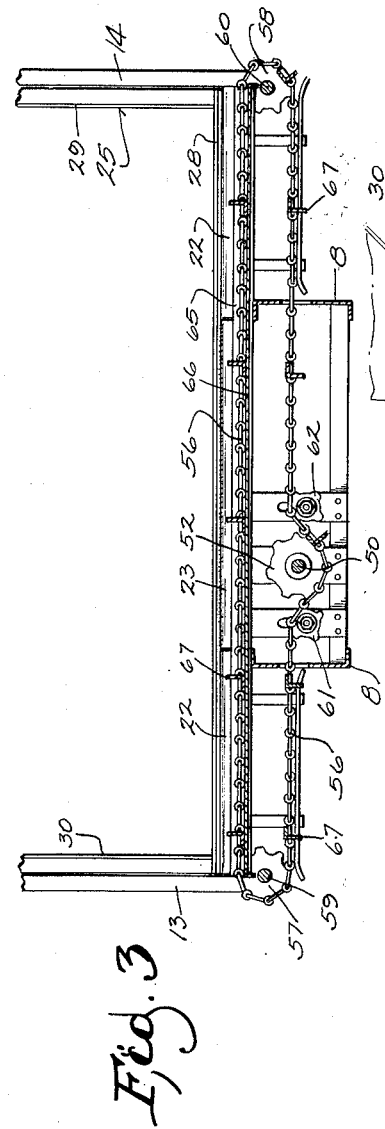
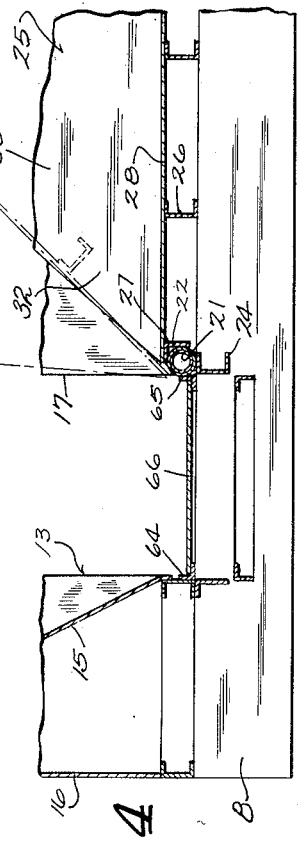
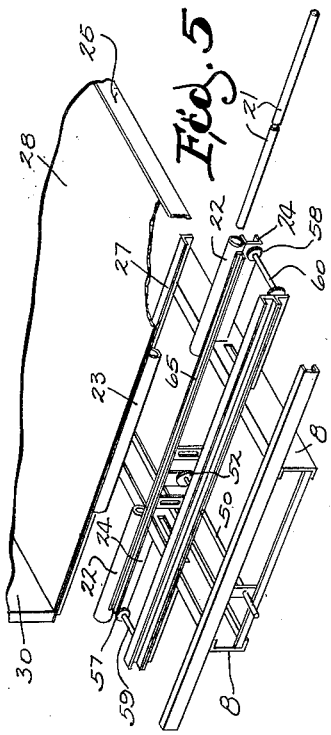
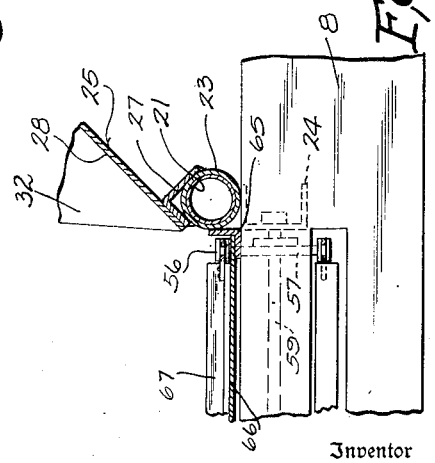
Inventor
MARTIN C. OTTENBACHER
By Wheeler, Wheeler & Wheeler
Attorneys Patented Dec. 19, 1950

2,534,558

UNITED STATES PATENT OFFICE 2,534,558

SELF-UNLOADING VEHICLE

Martin C. Ottenbacher, Fredonia, Wis.

Application December 27, 1948, Serial No. 67,398

5 Claims. (Cl. 214—83.16)

This invention relates to a self-unloading vehicle.

It is a primary object of the invention to provide a vehicle structure in which a portion of the body is tiltable with respect to another portion thereof to deliver the contents of the body onto a cross conveyor, the two component parts of the body constituting a hopper assuring discharge of all material when the tiltable portion of the body is raised.

This and other objects of the invention will appear more particularly from the following disclosure thereof with particular reference to the accompanying drawings, wherein:

Fig. 2 shows the vehicle partially in plan and partially in horizontal section.

Fig. 3 is a fragmentary detail view in transverse section on the line 3—3 of Fig. 2.

Fig. 4 is a fragmentary detail view in longitudinal section.

Fig. 5 is a fragmentary detail view in perspective showing parts of the chassis and body in process of assembly.

Fig. 6 is a fragmentary detail view in section taken on an enlarged scale longitudinally of the vehicle at the point of pivotal connection of the tiltable portion to the chassis.

Figure 1:
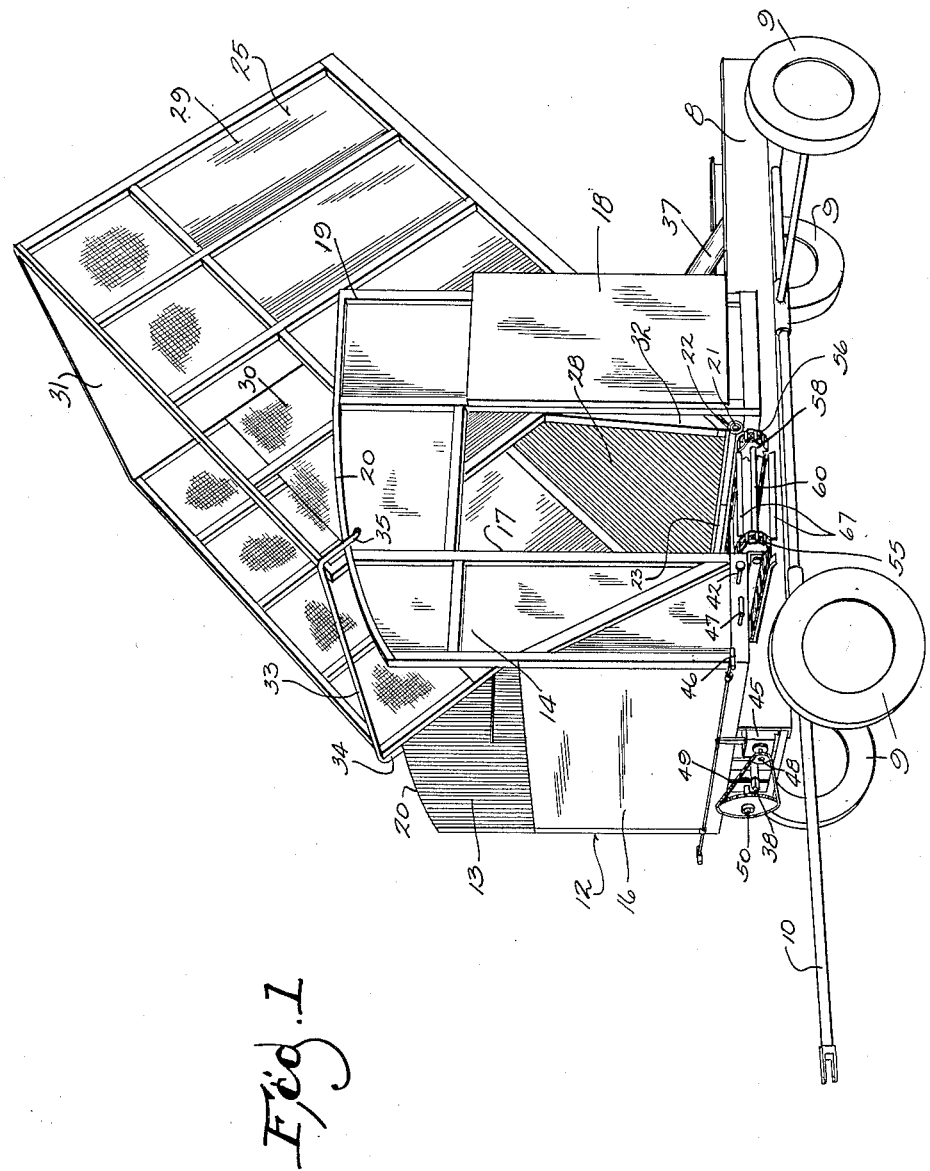
Fig. 1 is a view in perspective showing my self-unloading vehicle in unloading position.

My improved vehicle desirably, although not necessarily, comprises a trailer having a frame 8 supported by wheels 9 and provided with a tongue at 10 for connection with a tractor.

At one end of the vehicle frame, desirably the forward end, there is a stationary body section generically designated by reference character 12. There are upstanding side walls 13 and 14 cross connected at the end of the vehicle by a slanting hopper wall 15 which is inclined toward the conveyor hereinafter to be described. Although unnecessary for the confinement or guidance of the contents of the vehicle, I may provide for added strength a false end wall 16 connecting the side walls for at least a portion of their height.

Each of the side walls is provided with a door frame 17 in which is hinged a door 18. At its upper rear corner 19, each side wall is free, having no support except downwardly to the chassis and forwardly to the portion of the side wall ahead of the door frame.

The top margin 20 of each side wall may desirably be arcuately curved concentrically with the pintle upon which the tiltable body section 25 is oscillatable between its horizontal and tilted positions. This pintle comprises a bar 21 (Fig. 5) which extends through two sleeves 22 connected with frame 8 and an intervening sleeve 23 connected with the forward end of the tiltable body section 25. The sleeves 22 may be supported in any desired manner, as by means of channels 24 projecting laterally from the chassis frame 8.

The tiltable body section 25 comprises a sub-frame of its own which includes the channels 26 (Fig. 4) and an angle member 27 which engages the several sleeves 22, 23 to preclude leakage through the hinged joint established by pintle 21. Extending rearwardly from the upper flange of the angle 27 is the floor 28 of the tiltable body section. This floor is enclosed by side wall panels 29, 30 and rear wall 31. The side wall panels 29, 30 of the movable body section terminate short of the hinge and are supplemented by triangular panels 32. While the details of construction are unimportant, I prefer that the lower parts of the side walls 29 and 30, and all of the back wall 31, be solid, but that the upper parts of the side wall panels be enclosed only with screen cloth. The front corners of the side walls are connected by a cross tie at 33 having downwardly extending fingers 34, 35 which, as best shown in Fig. 1, engage over the curved margins 20 of the sides of the stationary body section 12, thereby to provide mutual support for the otherwise free corners of the sides of the respective sections. This is particularly important with reference to the side corners 19 of the stationary body section 12 which, as noted above, do not have any direct connection with each other.

For raising the tiltable body section 25 from the position shown in Fig. 4 to that shown in Fig 1, I employ any suitable hoist mechanism such as the conventional hydraulic hoist indicated at 37 in Fig. 2. Where the vehicle is a trailer, drawn by a separate tractor, I may use power from the tractor to operate this hoist, as well as the conveyor hereinafter to be described. For this purpose, the vehicle is equipped with a power input shaft at 38 at its forward end, such shaft having a squared end 39 to receive coupling from the power take-off of any tractor. This shaft is directly coupled with the hydraulic pump 40, the control valve 41 of which is diagrammatically illustrated and provided with an operating control rod 42 which extends completely across the vehicle and is exposed at both sides thereof so that it may be manipulated from either side. With the shaft 38 in operation, this control valve permits power to be communicated to the hoist 37 for raising or lowering the tiltable body section 25 upon its hinged connection with the chassis frame 8.

The shaft 38 is provided with sprocket and chain connections at 44 to a transmission 45 which desirably contains change speed gearing controlled by shifting rod 46 and a clutch controlled by clutch rod 47. Both rods extend transversely from one side of the vehicle to the other, to be operable from either side. Since the specific transmission employed constitutes no part of the present invention, no details are shown.

The transmission output shaft 48 is connected by chain 49 with a shaft 50 which carries spaced sprockets 51, 52 for driving the conveyor chains 55, 56. These chains are of the conventional type commonly used in farm machinery, having readily separable links. The chains are guided over terminal sprockets 57, 58 on shafts 59 and 60 which are located near the sides of the stationary section of the body. The lower run of each chain may pass either beneath driving sprockets 51, 52, being held thereto by idlers 61, 62 (Fig. 3), or, by simply disassembling each chain and running it over the respective driving sprockets 51, 52, the chain may be caused to operate in the opposite direction. Since a truck of this type will ordinarily be unloaded in the same direction throughout its period of use by one owner, it is not necessary to provide any other reverse mechanism.

The stationary body section is provided with conveyor guides 64, 65 (Figs. 4 and 6) spanned by a smooth bed 66. Welded to corresponding selected links of the chains 55 and 56 are the propelling flights 67 which ride on the smooth bed 66 to deliver the material thereover.

With the doors 18 closed and the movable section 25 of the body lowered to its work-transporting position in which it is shown in Fig. 4, the body will receive quite a large mass of material such as chopped fodder, or corn, or other agricultural produce or grains. Being particularly designed for such relatively light material as chopped fodder, its capacity is desirably large. Where the chopped produce is the material to be transported, it is commonly blown into the top of the open body by means of a pneumatic conveyor.

When the body is filled, it is transported to the place of unloading. One of the doors is opened at the side toward which the unloading conveyor is to operate, and the clutch and gear shift levers 46, 47 are manipulated to set the conveyor in motion. Simultaneously, or subsequently, the control member 42 may be manipulated to adjust the hydraulic valves to elevate the movable body section 25 to the unloading position shown in Fig. 1.

It will be observed that in the tilted position of the movable body section 25, its floor 28 constitutes one side of a hopper, the inclined wall 15 of the stationary body section constituting an opposing and oppositely inclined surface. The cross conveyor operates transversely of the bottom of the hopper thus established, and unloading is speedily and effectively completed. By reason of the fact that the two parts of the body cooperate to form a hopper, the entire contents of the body are delivered to the conveyor and discharged without requiring any manual labor to effect this result.

In practice, a trailer of this kind is loaded by towing it behind a vehicle, the forage being delivered pneumatically by a blower into the body of the trailer. It is very important that in the present device the material is unloaded in reverse order, the last material to be delivered into the trailer being the first to be removed by the conveyor when the movable section of the trailer body is tilted. The reason why this is important is because the stems, hay or grass interlock with each other as delivered, and if the trailer body is unloaded from the rear, in accordance with conventional practice, the material is discharged in lumps. Delivery occurs in uniform flow from the present apparatus as compared with irregular delivery which occurs with conventional apparatus where the material breaks off from time to time and forms "cliffs" during intervening periods.

I claim:

1. In a device of the character described, the combination with a frame provided with a cross conveyor, of a plurality of storage chamber body sections, at least one of which comprises a floor in hinged connection with said frame adjacent the conveyor, said sections having lapping side walls, the side walls of the section with the hinged floor being connected with the floor for hinged movement respecting the side walls of the other section.

2. The device of claim 1 in which the walls of one of said sections have a cross connection and spaced fingers guided for movement along the walls of the other section.

3. In a self-unloading vehicle, the combination with a chassis frame and a cross conveyor mounted thereon, of a body section having a floor extending forwardly of said conveyor, a second body section having the floor extending rearwardly of said conveyor, at least one of said sections having a pivotal connection with the chassis frame adjacent floor level and adjacent the conveyor, whereby the floor of the said last mentioned section is tiltable from a substantially horizontal position to a position of inclination toward said conveyor, the said sections having lapping walls, together constituting a substantially complete enclosure about the respective floor sections and conveyor, the lap of said walls being adapted to accommodate tilting movement of the tiltable section.

4. A self-unloading vehicle comprising the combination with a chassis frame and a cross conveyor operatively mounted thereon, of a first body section fixed to said chassis frame and provided with a bottom inclined toward said conveyor, said first body section comprising side walls extending beyond the conveyor and provided with a door opening in registry with the conveyor, a second body section having a floor normally horizontal and in hinged connection with said chassis frame adjacent the conveyor, said floor being tiltable upon said hinged connection to a position of inclination toward said conveyor, whereby the floors of the respective sections constitute a hopper discharging onto said conveyor, the second mentioned section having an end wall and side walls lapping the side walls of the section first mentioned and movable telescopically respecting the side walls of the first mentioned section in the course of the tilting of the second mentioned section, together with hoist mechanism for tilting the second mentioned section.

5. The device of claim 4 in which the side walls of the second mentioned section are provided at their upper corners nearest the conveyor with a cross connection and with guide fingers riding externally of the side walls of the first mentioned body section.

MARTIN C. OTTENBACHER.

REFERENCES CITED

The following references are of record in the file of this patent:

UNITED STATES PATENTS

| Number | Name | Date |
|---|---|---|
| 725,095 | Kreutler et al. | Apr. 14, 1903 |
| 1,759,003 | Davidson | May 20, 1930 |
| 1,928,859 | Kutscha | Oct. 3, 1933 |
| 2,267,526 | Kutscha | Dec. 23, 1941 |
| 2,356,434 | Russell | Aug. 22, 1944 |